(No Model.)
A. CURTICE.
DRAFT EQUALIZER.
No. 350,580. Patented Oct. 12, 1886.
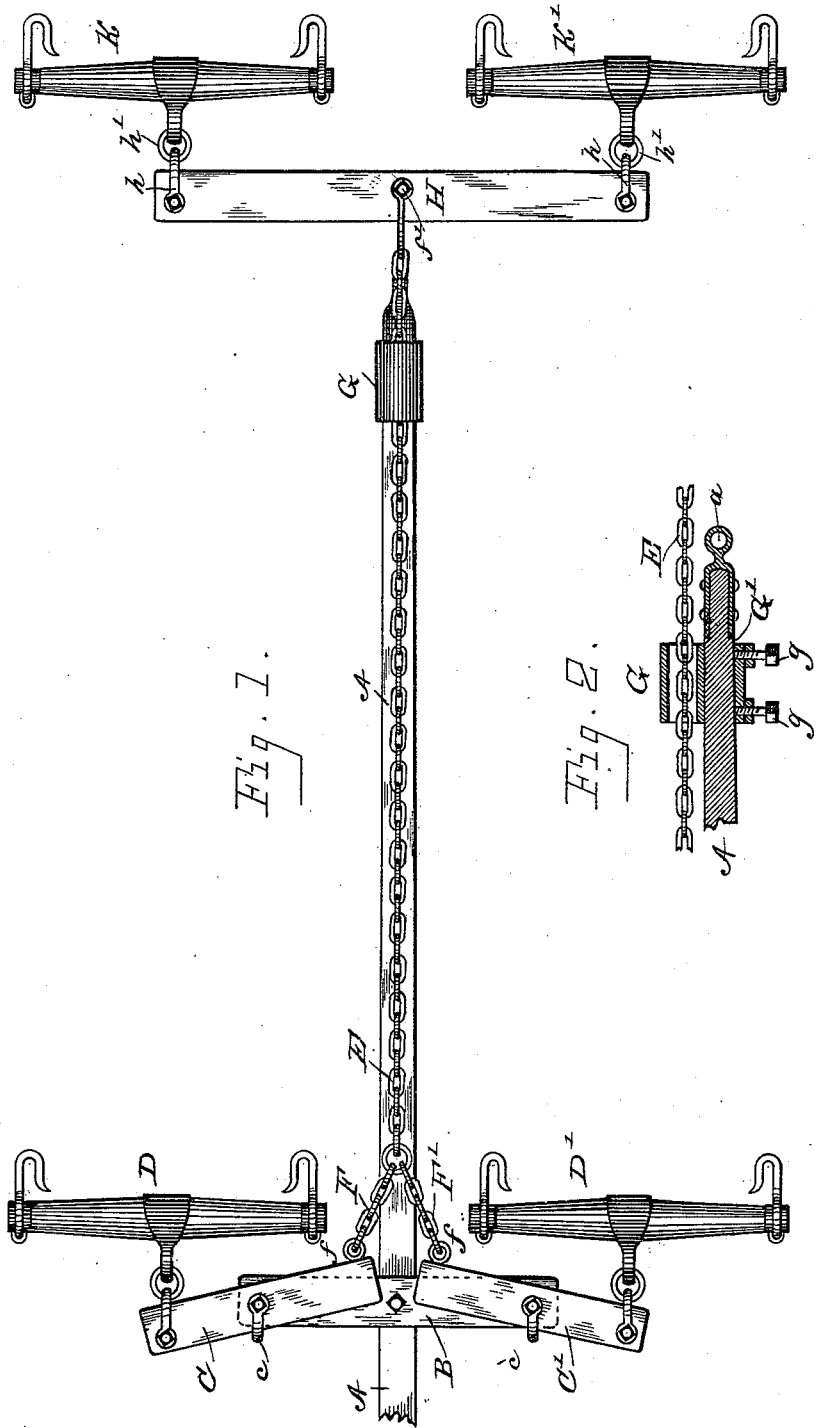
WITNESSES
John C. Miller
Percy White
INVENTOR
Alexander Curtice
by J. W. F. Annen
Attorney

UNITED STATES PATENT OFFICE.

ALEXANDER CURTICE, OF EVERGREEN, IOWA.

DRAFT-EQUALIZER.

SPECIFICATION forming part of Letters Patent No. 350,580, dated October 12, 1886.

Application filed February 19, 1886. Serial No. 192,514. (No model.)

*To all whom it may concern:*

Be it known that I, ALEXANDER CURTICE, a citizen of the United States, residing at Evergreen, in the county of Tama and State of Iowa, have invented certain new and useful Improvements in Draft-Equalizers; and I do hereby declare the following to be a full, clear, and exact description of the invention, such as will enable others skilled in the art to which it appertains to make and use the same.

The object of this improvement is to provide a device for equalizing the draft of four-horse teams, and to adapt the same to facilitate guiding the wagon by causing the lead-horses to pull the wagon-tongue to one side or the other, according to the direction they take. These results are attained by the mechanism illustrated in the drawings herewith filed as part hereof, in which the same letters of reference denote the same parts in the different views.

Figure 1 is a plan view of a draft-equalizing device embodying the features of my improvement. Fig. 2 is a sectional detail representation.

A is an ordinary wagon-tongue provided at its front end with the usual coupling-eye, $a$, for the attachment of a double-tree, as occasion may require.

B is a double-tree connected to the tongue A in the ordinary way.

C C' are bars pivotally connected to the double tree B by any suitable means or by links and bolts, as indicated at $c\ c'$.

D D' are whiffletrees fixed to the bars C C' in the usual manner of connecting whiffletrees to an ordinary double-tree.

E is a chain connected angularly by chains F F' and eyes $f\ f$ with the bars C C', and through a double cylinder, G G', affixed to the wagon-tongue, as shown in Fig. 2, with a double-tree, H, by means of a link and bolt, $f$. K K are whiffletrees affixed to the double-tree H by links and rings $h\ h'$, or other suitable connections.

The wagon-tongue A is inserted into the part G' of the double cylinder, which is detachably secured thereto by the set-screws $g\ g$, for a purpose hereinafter fully explained.

The operation is as follows: Should the wheel-horses fail to pull evenly with the leaders, the draft of the latter applied through the chain E would act on the bars C C' through the chains F F', and by drawing their inner ends forward give their outer ends a rearward tendency, as shown in Fig. 1, and by applying the draft on the wheel-horses, through the whiffletree and trace, connections, cause the wheel-horses to pull accordingly, and thus equalize the draft. Should the leaders fail to pull, the wheel-horses would pull the outer ends of the bars C C' forward, and by thus applying the force of their draft on the leaders, through the chain E and its connections, cause the leaders to pull accordingly, and thus equalize the draft. Should either one of the wheel-horses fail to pull, the bars C C' would have a tendency to take the position shown, and by forcing the delinquent horse to pull thus equalize the draft; and should one of the leaders fail to pull the force of the two wheel-horses and the other leader would be applied on the delinquent leader through the chains E F F' and the double-tree H, and by causing the delinquent leader to pull accordingly thus equalize the draft, and by reason of the general action of the parts a steady draft must be maintained by each horse in the team. Because of the chain E passing through the cylinder G, secured to the tongue A, when the lead-horses take a direction to one side or the other, the tongue will be given a corresponding motion, and the mechanism thus made to facilitate guiding the wagon or other implement to which the team may be hitched.

The double cylinder G G' may be detached from the tongue A when a double team only is to be used.

Having explained the features and operation of my improvement, what I claim as new, and desire to secure by Letters Patent, is—

The tongue A, provided with a double cylinder, G G', in combination with the double-tree B, provided with pivotally-connected bars and whiffletrees, chains F, F', and E, double-tree H, and whiffletrees K K', all arranged to operate as described, for the purpose set forth.

In testimony whereof I affix my signature in presence of two witnesses.

ALEXANDER CURTICE.

Witnesses:
   N. C. RICE,
   WILLIAM CURTICE.